US010197109B2

(12) United States Patent
Tagashira et al.

(10) Patent No.: US 10,197,109 B2
(45) Date of Patent: *Feb. 5, 2019

(54) CLUTCH PLATE FOR MULTIPLATE WET CLUTCH AND METHOD OF MANUFACTURING THE SAME

(71) Applicant: Nisshin Steel Co., Ltd., Tokyo (JP)

(72) Inventors: Satoshi Tagashira, Kure (JP); Masahito Suzuki, Kure (JP); Tomohiro Imanaka, Kure (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,560

(22) Filed: May 3, 2017

(65) Prior Publication Data

US 2017/0234371 A1    Aug. 17, 2017

Related U.S. Application Data

(62) Division of application No. 14/765,060, filed as application No. PCT/JP2014/051359 on Jan. 23, 2014.

(30) Foreign Application Priority Data

Jan. 31, 2013  (JP) .................................. 2013-016754
Oct. 25, 2013  (JP) .................................. 2013-222746

(51) Int. Cl.
| | | |
|---|---|---|
| C21D 8/02 | (2006.01) | |
| C21D 9/00 | (2006.01) | |
| C21D 9/32 | (2006.01) | |
| C21D 9/46 | (2006.01) | |
| B21D 53/88 | (2006.01) | |
| B22D 11/00 | (2006.01) | |
| C22C 33/04 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/26 | (2006.01) | |
| C22C 38/28 | (2006.01) | |
| C22C 38/54 | (2006.01) | |
| F16D 13/64 | (2006.01) | |
| F16D 13/72 | (2006.01) | |
| F16D 13/74 | (2006.01) | |

(52) U.S. Cl.
CPC ........... *F16D 13/648* (2013.01); *B21D 53/88* (2013.01); *B22D 11/001* (2013.01); *C21D 8/0205* (2013.01); *C21D 8/0226* (2013.01); *C21D 8/0236* (2013.01); *C21D 8/0263* (2013.01); *C21D 9/0068* (2013.01); *C21D 9/32* (2013.01); *C22C 33/04* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/26* (2013.01); *C22C 38/28* (2013.01); *C22C 38/54* (2013.01); *C21D 9/46* (2013.01); *C21D 2211/004* (2013.01); *F16D 13/72* (2013.01); *F16D 13/74* (2013.01); *F16D 2200/0021* (2013.01); *F16D 2200/0082* (2013.01); *F16D 2250/0023* (2013.01)

(58) Field of Classification Search
CPC .. C21D 8/0226; C21D 8/0236; C21D 8/0263; C21D 2211/004; F16D 13/648; F16D 2200/0021; C22C 33/04; C22C 38/002; C22C 38/02; C22C 38/04; C22C 38/06; C22C 38/08; C22C 38/12; C22C 38/14; C22C 38/18; C22C 38/22; C22C 38/24; C22C 38/26; C22C 38/28; C22C 38/32; C22C 38/40; C22C 38/44; C22C 38/46; C22C 38/50; C22C 38/54
See application file for complete search history.

(56) References Cited

U.S. PATENT DOCUMENTS

| | | | | |
|---|---|---|---|---|
| 5,108,518 | A | * 4/1992 | Fukui | .................. C21D 8/0226 |
| | | | | 148/603 |
| 2001/0001049 | A1 | 5/2001 | Higo et al. | |
| 2003/0106622 | A1* | 6/2003 | Matsuoka et al. | ............ 148/603 |
| 2005/0106411 | A1 | 5/2005 | Ishikawa et al. | |
| 2011/0048588 | A1 | 3/2011 | Mega et al. | |

FOREIGN PATENT DOCUMENTS

| | | |
|---|---|---|
| CN | 1884603 | 12/2006 |
| CN | 101960036 A | 1/2011 |

(Continued)

OTHER PUBLICATIONS

European Extended Search Report dated Jul. 28, 2016, issued in the corresponding European Patent Application No. 14746827.6.

*Primary Examiner* — C Melissa Koslow
(74) *Attorney, Agent, or Firm* — Troutman Sanders LLP

(57) ABSTRACT

A separator plate for use as a clutch plate for a multiplate wet clutch is formed of a steel plate. The steel plate has a chemical composition containing, on a basis of percent by mass, C from 0.03 to 0.08%, Si from 0 to 1.0%, Mn from 0.2 to 0.8%, P at 0.03% or less, S at 0.01% or less, and Al at 0.05% or less, so as to satisfy a formula, 5*C %−Si %+Mn %−1.5*Al %<1. In addition, the steel plate has the chemical component containing at least one of Nb from 0.03 to 0.4%, V from 0.01 to 0.3%, and Ti from 0.01 to 0.3%, so as to satisfy a formula, 0.04<(Nb %/1.4)+(V %/1.1)+Ti %<0.3. Then, an average diameter of particles of a carbide as a precipitate is controlled to be from 20 to 100 nm. The plate is formed by heating, hot rolling, winding and forming.

6 Claims, 1 Drawing Sheet

(56) References Cited

FOREIGN PATENT DOCUMENTS

| | | |
|---|---|---|
| EP | 0475096 A1 | 3/1992 |
| EP | 1143022 A1 | 10/2001 |
| EP | 1577412 A1 | 9/2005 |
| JP | 2001073073 A | 3/2001 |
| JP | 2003277883 A | 10/2003 |
| JP | 2004107722 A | 4/2004 |
| JP | 2004162153 A | 6/2004 |
| JP | 2005089853 A | 4/2005 |
| JP | 2005249050 A | 9/2005 |
| JP | 2005249051 A | 9/2005 |
| JP | 2005249106 A | 9/2005 |
| JP | 2006291236 A | 10/2006 |
| JP | 2007211260 A | 8/2007 |
| JP | 2008266731 A | 11/2008 |
| JP | 2010132983 A | 6/2010 |
| JP | 2011001604 A | 1/2011 |
| JP | 2012180547 A | 9/2012 |
| JP | 2013227656 A | 11/2013 |

* cited by examiner

CLUTCH PLATE FOR MULTIPLATE WET CLUTCH AND METHOD OF MANUFACTURING THE SAME

CROSS-REFERENCE TO RELATED APPLICATIONS

The present application is a divisional of U.S. patent application Ser. No. 14/765,060, filed Jul. 31, 2015, which is the U.S. National Phase of International Patent Application No. PCT/JP2014/051359, filed Jan. 23, 2014, which claims priority to Japanese Patent Application Serial No. 2013-016754, filed Jan. 31, 2013, and Japanese Patent Application Serial No. 2013-222746, filed Oct. 25, 2013. The contents of the foregoing applications are hereby incorporated by reference in their entireties.

TECHNICAL FIELD

The present invention relates to a clutch plate for a multiplate wet clutch used for example in a transmission, and a method of manufacturing the same.

BACKGROUND

A multiplate wet clutch for an automatic transmission has an alternate arrangement of multiple friction plates each with a friction material formed of a special sheet of paper attached to a surface thereof and separator plates to contact the friction plates. Action of making a switch between separating and connecting the friction plates and the separator plates controls transmission of power.

The friction plate and the separator plate are both ring-shaped steel plate members. Generally, such a friction plate and a separator plate forming the multiplate wet clutch are collectively called a clutch plate.

The following four phenomena are known as major defect phenomena occurring in the separator plate: wear of a spline part (hereinafter called feature A); a rattle due to an inaccurate position of the spline part (hereinafter called feature B); change in roughness due to wear of a surface in friction with the friction plate (hereinafter called feature C); and the occurrence of a heat spot and nonuniformity of a shape and a material quality due to the heat spot (hereinafter called feature D). All of these phenomena are significant characteristics, among which a defect due to heat spots is the hardest to deal with.

In response to behavior of the multiplate wet clutch to make a shift from a neutral state to a power transmission state to engage the clutch, the friction plate and the separator plate are pressed against each other under high load and a high relative velocity. This rapidly reduces the relative velocity between the friction plate and the separator plate. Resultant frictional heat rapidly enters a surface of the separator plate to become a sliding portion, thereby increasing the temperature of the surface of the separator plate. This temperature increase in the surface of the separator plate becomes a cause for the occurrence of a heat spot.

A projection at the heat spot area resulting from heating with the frictional heat, distortion occurring around the heat spot, and local change in a material quality cause a nonuniform frictional state when the clutch is actuated. The nonuniform frictional state causes a new heat spot. Such a vicious cycle degrades the performance of the multiplate wet clutch to a large extent.

Enhancing fuel efficiency of automobiles is an extremely important problem to be solved at the present time. Enhancing efficiency in terms of a mechanistic aspect and reducing the size and weight of the clutch as a unit are very important elements among various elements forming an automobile.

Requirements for a transmission include enhancement of efficiency, reduction in friction loss, and reduction in size and weight. The efficiency of the multiplate wet clutch should be enhanced to satisfy these requirements. The efficiency of the multiplate wet clutch may be enhanced for example by reduction in the diameter of a plate, reduction in the number of plates, and increase in a coefficient of friction achieved by reducing a lubricant and changing a friction material. However, all of these become causes for excessive temperature increase, specifically, a heat spot that cannot be handled with a conventional technique.

Enhancing the performance of the clutch plate in terms of its material may lead to dramatic enhancement of the efficiency of the transmission.

Methods described for example in Japanese Laid-open Patent Application Publication No. 2005-249050 (the '050 application), Japanese Laid-open Patent Application Publication No. 2005-249051 (the '051 application), Japanese Laid-open Patent Application Publication No. 2005-249106 (the '106 application), Japanese Laid-open Patent Application Publication No. 2008-266731 (the '731 application), and Japanese Laid-open Patent Application Publication No. 2010-132983 (the '983 application), are known as techniques relating to enhancement of the heat spot resistance of a steel plate for a clutch plate.

According to the method described in the '050 application, temperature of phase transformation from ferrite to austenite is increased using low-carbon steel. This prevents the occurrence of phase transformation even if a plate is heated by frictional heat during engagement of a clutch, thereby suppressing the occurrence of a heat spot.

According to the method described in the '051 application, the thermal diffusivity of a steel plate is increased by defining an alloy element content. This suppresses temperature increase of a plate to be caused by frictional heat to suppress the occurrence of a heat spot.

According to the method described in the '106 application, austenitic stainless steel unlikely to be phase transformed is used as a material for a plate, thereby suppressing the occurrence of a heat spot.

According to the method described in the '731 application, a Ti precipitate or an Nb precipitate is used to suppress the occurrence of a heat spot.

According to the method described in the '983 application, in addition to using a Ti precipitate or an Nb precipitate, Si or Al having the effect of increasing a transformation point is added to suppress the occurrence of a heat spot.

Methods described in Japanese Laid-open Patent Application Publication No. 2001-73073 (the '073 application), Japanese Laid-open Patent Application Publication No. 2003-277883 (the '883 application), Japanese Laid-open Patent Application Publication No. 2007-211260 (the '260 application), and Japanese Laid-open Patent Application Publication No. 2004-162153 (the '153 application) are known as techniques relating to enhancement of the antiwear performance of a tooth tip of the separator plate.

According to the method described in the '073 application, antiwear performance is enhanced by using a hard precipitate such as TiC or cementite.

According to the method described in the '883 application, a hot-rolled steel plate having a ferrite structure with ferrite particles with a diameter of 5 μm or more and 15 μm or less is cold rolled at rolling reduction of 50% or more, thereby enhancing antiwear performance.

According to the method described in the '260 application, a steel structure is controlled through combined addition of Cr, Ti, and B, thereby enhancing antiwear performance.

According to the method described in the '153 application, a steel structure is controlled by controlling a fraction of pearlite and that of cementite and controlling the diameter of ferrite particles, thereby enhancing antiwear performance.

SUMMARY

Since a clutch plate is cooled by transmission oil during the operation of a multiplate wet clutch, the temperature of the clutch plate is 100° C. or less normally, but the plate is heated resulting from the generation of frictional heat as described above. In the case of a larger friction imparted, the clutch plate may be heated locally up to 800° C. or more. Such frictional heat locally heats the clutch plate, not heating the entire clutch plate uniformly.

The local heating may likely cause fatigue failure in the clutch plate.

Specifically, in the case where the strength of the steel plate is lowered by the effect of annealing due to heating, fatigue strength is also lowered. Especially in the case where a so-called full hard material of which strength is heightened by cold rolling is used, softening is likely progressed when the temperature resulting from heating with the frictional heat is higher than 600° C.

In the case where martensitic transformation locally occurs resulting from heating, fatigue strength is lowered due to the embrittlement of the martensitic phase. Especially in the case of using a steel plate containing a large amount of carbon, such as S55C and the like, fatigue strength is easily lowered at a temperature higher than 800° C.

Further, in the case where martensitic transformation locally occurs resulting from heating, the martensitic phase may have high strength, while the strength of the periphery of the part affected by the heat may be lowered.

Even in the case where change in hardness resulting from heating is small, thermal effect on a metal structure may induce coarsening of the diameter of crystal grains. Such coarsening of the diameter of crystal grains may likely occur especially in a steel plate formed based on a single phase structure of ferrite steel, and fatigue strength is lowered resulting from the coarsened diameter of ferrite crystal grains.

None of the above PTL 1 to PTL 9 gives consideration to the lowered fatigue strength resulting from heating with the frictional heat.

Thus, a clutch plate for a multiplate wet clutch achieving favorable fatigue strength has been required.

This invention has been made in view of the aforementioned issues. It is an object of this invention to provide a clutch plate for a multiplate wet clutch with favorable fatigue strength and a method of manufacturing the clutch plate for a multiplate wet clutch.

An example clutch plate for a multiplate wet clutch is a clutch plate for a multiplate wet clutch formed of a steel plate, and the steel plate has a chemical composition containing, on a basis of percent by mass, C from 0.03 to 0.08%, Si from 0 to 1.0%, Mn from 0.2 to 0.8%, P at 0.03% or less, S at 0.01% or less, and Al at 0.05% or less, so as to satisfy a formula (1), 5*C %−Si %+Mn %−1.5*Al %<1, and also the chemical composition further containing at least one of Nb from 0.03 to 0.4%, V from 0.01 to 0.3%, and Ti from 0.01 to 0.3%, so as to satisfy a formula (2), 0.04<(Nb %/1.4)+(V %/1.1)+Ti %<0.3, with a residue being formed of Fe and unavoidable impurities, wherein an average diameter of particles of a carbide containing one of the Nb, the V and the Ti as a precipitate in the steel plate is from 20 to 100 nm, and the steel plate has cross-sectional hardness from 200 HV to 350 HV.

According to an example steel plate of a clutch plate for a multiplate wet clutch, in the clutch plate for a multiplate wet clutch according to claim 1, the chemical composition contains, on the basis of percent by mass, at least one of Cr from 0.10 to 2.0%, Ni from 0.05 to 0.5%, Mo from 0.05 to 0.5%, and B from 0.0002 to 0.002%, so as to satisfy a formula (3).

According to an example clutch plate for a multiplate wet clutch, in the clutch plate for the multiplate wet clutch, the average diameter of particles of the carbide containing one of the Nb, the V and the Ti as a precipitate is from 20 to 100 nm in a front layer part extending at least 200 μm from a surface of the steel plate.

According to an example method of manufacturing a clutch plate for a multiplate wet clutch, the steel slab having the chemical composition is smelted, the steel slab is heated to 1200° C. or more and hot rolled to form a hot-rolled steel plate, the hot-rolled steel plate is wound from 500° C. to 700° C. to form a hot-rolled coil, and a steel plate having cross-sectional hardness of 200 to 350 HV is made by use of the hot-rolled coil, and the steel plate is formed into a prescribed shape.

According to an example method of manufacturing a clutch plate for a multiplate wet clutch, in the method of manufacturing the clutch plate for a multiplate wet clutch, the hot-rolled coil is cold rolled or the hot-rolled coil is annealed and cold rolled, thereby obtaining cross-sectional hardness from 200 HV to 350 HV, and the cold-rolled steel plate is formed into a prescribed shape.

According to an example clutch plate for a multiplate wet clutch, in the clutch plate for a multiplate wet clutch, the average diameter of the particles of the carbide containing any one of the Nb, the V and the Ti as a precipitate is from 20 to 100 nm in a front layer part extending at least 200 μm from a surface of the steel plate.

According to an example method of manufacturing a clutch plate for a multiplate wet clutch, the steel slab having the chemical composition is smelted, the steel slab is heated to 1200° C. or more and hot rolled to form a hot-rolled steel plate, the hot-rolled steel plate is wound from 500° C. to 700° C. to form a hot-rolled coil, and a steel plate having cross-sectional hardness of 200 to 350 HV is made by use of the hot-rolled coil, and the steel plate is formed into a prescribed shape.

According to an example method of manufacturing a clutch plate for a multiplate wet clutch, in the method of manufacturing the clutch plate for a multiplate wet clutch, the hot-rolled coil is cold rolled or the hot-rolled coil is annealed and cold rolled, thereby obtaining cross-sectional hardness from 200 HV to 350 HV, and the cold-rolled steel plate is formed into a prescribed shape.

According to this invention, the chemical composition is regulated, and the steel plate having the average diameter of particles of the precipitated carbide from 20 to 100 nm is used. This can suppress the metal structure from being changed and hardness from being lowered resulting from heating with the frictional heat, and enhance fatigue strength.

DETAILED DESCRIPTION

An embodiment of this invention will be described.

Figure 1:
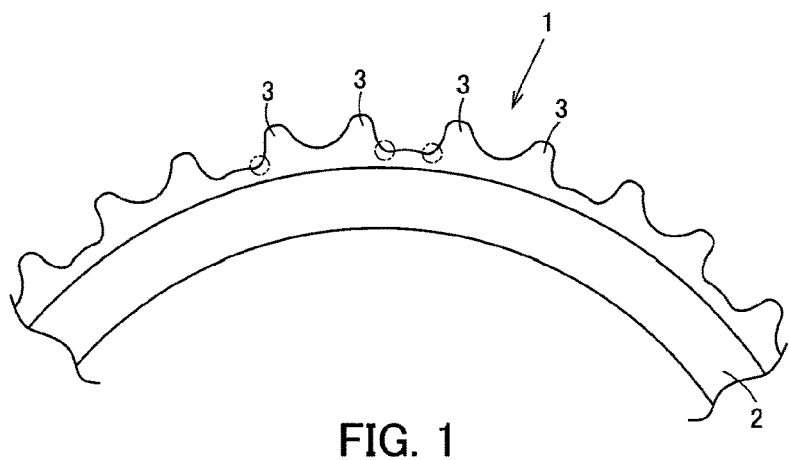
FIG. 1 is a plane view showing a part of a clutch plate of one embodiment of this invention.

FIG. 1 shows a separator plate 1 to be used as a clutch plate for a multiplate wet clutch. A clutch plate for a multiplate wet clutch is a clutch plate to be used in a multiplate wet clutch mechanism such as in an automatic transmission of an automobile.

The separator plate 1 is formed of a cold-rolled steel plate. The separator plate 1 includes a base 2 that is formed in a ring shape and a spline part 3 that protrudes outside from the outer circumferential edge of the base 2.

In a multiplate wet clutch, if the clutch is engaged under high load, temperature increases considerably by friction in a surface of the separator plate 1 in the engaged state. This austenitizes the metal structure of the cold-rolled steel plate. The region where austenitization occurs in the cold-rolled steel plate in response to temperature increase during engagement of the clutch is limited to a front layer of the steel plate. Temperature increase to a degree that causes phase transformation does not occur inside the steel plate.

The heated region in the surface of the steel plate is rapidly cooled (self-cooled) resulting from rapid heat conduction to the inside of the steel plate in a low temperature to be martensitically transformed.

If the part heated by friction is rapidly cooled by self-cooling to be martensitically transformed, a resultant martensitic structure expands in volume to form a heat spot that is a region like a projection projecting to a higher position than its surrounding.

The change in shape occurring during the martensitic transformation applies residual tensile stress to a surrounding structure. This damages the flatness of the cold-rolled steel plate to distort the cold-rolled steel plate.

Such a heat spot is suppressed effectively by the following first to fourth countermeasures.

The first countermeasure is to suppress temperature increase of the separator plate 1 by frictional heat. More specifically, the heat conductivity of the cold-rolled steel plate forming the separator plate 1 is increased. This rapidly diffuses heat from a friction part in the surface to a surrounding, thereby suppressing abnormal temperature increase from occurring locally in the outermost surface.

The heat conductivity of the cold-rolled steel plate becomes highest in pure iron and becomes lower with increase in an alloy element added content. The heat conductivity also becomes lower with increase in the volume fraction of a second phase such as pearlite. Meanwhile, adding an alloy element into steel is necessary for ensuring appropriate strength and antiwear performance of the steel plate as the separator plate 1.

Strength and antiwear performance required for the steel plate as the separator plate 1 are ensured and high heat conductivity is maintained effectively by forming a dispersed metal structure with fine precipitates dispersed uniformly in a ferrite structure.

The second countermeasure is to suppress transformation into the γ phase of a metal structure in a front layer part of the separator plate 1 even if the temperature of the separator plate 1 is increased by frictional heat. More specifically, even if temperature increase of the surface of the cold-rolled steel plate by the frictional heat is unavoidable, austenitization to occur resulting from temperature increase by friction is still suppressed by making austenite transformation of the cold-rolled steel plate itself unlikely.

Austenite transformation is suppressed effectively by increasing a transformation point or delaying dissolving of a carbide.

A transformation point is increased effectively by adding an element to increase a point of α to γ transformation (transformation point A3) or reducing the added content of an element to reduce the transformation point A3.

Dissolving is delayed effectively by making a carbide exist in steel with stable properties that prevent dissolving of the carbide as much as possible.

In carbon steel, α to γ transformation starts with dissolving of a carbide at an interface between the carbide and the mother phase. If the carbide is dissolved in the α phase or the γ phase easily, the α to γ transformation proceeds promptly. Meanwhile, if the carbide is not dissolved easily, progress of the α to γ transformation is suppressed.

The transformation point drops with C, Mn, and Ni, and increases with Si and Cr. Thus, it is important to minimize the respective added contents of C, Mn, and Ni as much as possible. Where needed, the respective added contents of Si and Cr may be increased in consideration of other conditions, for example.

An Fe3C (cementite: θ)-based material as a carbide has the property of being dissolved easily. Meanwhile, in the case of steel containing Cr, Cr tends to be concentrated in Fe3C. The concentration of Cr stabilizes Fe3C. Compared to Fe3C, an Nb-based carbide, a V-based carbide or a Ti-based carbide has the property of being remarkably stable and having a low degree of solubility in the γ phase.

Specifically, dispersing an Nb-based carbide, a V-based carbide or a Ti-based carbide finely and uniformly is a considerably excellent method of ensuring the strength and antiwear performance of the cold-rolled steel plate. Thus, using an Nb-based carbide, a V-based carbide or a Ti-based carbide is a preferable method of suppressing transformation into the γ phase. Adding Nb, V or Ti is also an effective method of reducing C as an element to reduce a transformation point most prominently.

As described above, strength and antiwear performance are ensured effectively by adding Nb, V or Ti and forming a hard carbide. With the intention of reducing the amount of redundant C not to be bonded to Nb, V or Ti, an optimum added content is determined in consideration of a relationship of an Nb added content, a V added content or a Ti added content with the amount of C. This reduces the amount of dissolved C in a part heated by friction, thereby suppressing transformation into the γ phase further.

The third countermeasure is to suppress martensitic transformation that is caused by self-cooling of the separator plate 1 even if temperature increase by frictional heat transforms a metal structure in a front layer part of the separator plate 1 into the γ phase. More specifically, even if temperature increase and transformation into the γ phase of the surface of the cold-rolled steel plate are unavoidable, martensitic transformation that is caused by self-cooling is still suppressed by reducing the quenching performance of the cold-rolled steel plate.

The quenching performance is reduced effectively by reducing the added content of an element to enhance the quenching performance and by making the diameter of γ crystal grains finer.

To reduce (or to not enhance) the quenching performance, it is important to reduce the added content of Si, Mn, Ni, Cr, Mo, B and the like to the smallest possible amount.

The diameter of γ crystal grains is made finer effectively through use of a grain boundary pinning effect achieved by a fine precipitate. More specifically, an Nb-based carbide, a V-based carbide, a Ti-based carbide, and a nitride are dispersed finely to make the diameter of γ grains finer. This facilitates nucleation in the α phase during cooling from the γ phase, thereby reducing the quenching performance. Such use of Nb, V and Ti is considerably effective as it not only acts to enhance heat conductivity and suppress transformation into the γ phase, but also acts to enhance strength and antiwear performance.

The fourth countermeasure is to suppress deformation of the separator plate 1 due to transformation stress even if temperature increase by frictional heat transforms a metal structure in the front layer part of the separator plate 1 into the γ phase to martensitically transform the metal structure as a result of self-cooling. More specifically, even if martensitic transformation (conversion to a heat spot) of a heated part in the surface of the cold-rolled steel plate is unavoidable, distortion of the clutch plate due to the heat spot is suppressed by ensuring sufficient strength of a metal structure surrounding the heat spot.

As described above, the heat spot itself is considered to be a martensitic region formed from heating and rapid cooling of a friction part. Though not as high as in the heat spot, temperature increases in a surrounding of the heat spot resulting from frictional heat to affect the metal structure. The heat spot is subjected to phase transformation from α to γ and then to martensite. However, the surrounding of the heat spot is not heated to a degree that causes transformation into the γ phase, so that it becomes soft in many cases resulting from its material structure. More specifically, a cold-rolled steel plate generally used as the separator plate 1 has work hardness controlled to be from about 220 to about 320 HV through hardening by cold rolling. In the surrounding of the heat spot, the cold rolling causes recovery and recrystallization of a worked structure with heat resulting from frictional heat, thereby reducing hardness.

Thus, softening of the surrounding of the heat spot can be suppressed by suppressing recovery and recrystallization of a cold-rolled structure. More specifically, by adding Nb, V or Ti and forming a structure containing a highly thermally stable Nb-based carbide, V-based carbide or Ti-based carbide dispersed uniformly in the structure, recrystallization can be suppressed and reduction in hardness can be suppressed effectively.

In the separator plate 1, while the clutch is engaged, stress tends to act on a tooth tip of the spline part 3 shown by a two-dot chain line in FIG. 1.

Moreover, in the separator plate 1, the cold-rolled steel plate is easily lowered in strength and softened by localized heating with the frictional heat, and stress tends to act on a stress concentration part such as a tooth tip of the spline part 3 by the engagement of the clutch, thus easily causing fatigue failure at the part.

Then, it is very important to suppress change in metal structure and reduction of hardness based on the first to fourth countermeasures regarding the aforementioned heat spot resistance, from the point of view of fatigue strength of the structure of the separator plate 1 as a clutch plate for a multiplate wet clutch.

Based on the aforementioned first, second, third, and fourth countermeasures, the chemical composition of a cold-rolled steel plate forming the separator plate 1 is defined as follows. Unless otherwise stated, the content of each element is expressed on the basis of percent by mass.

The cold-rolled steel plate may have a chemical composition containing C from 0.03 to 0.08%, Si from 0 to 1.0% (including a case where Si is not added), Mn from 0.2 to 0.8%, P at 0.03% or less (excluding a case where P is not added), S at 0.01% or less (excluding a case where S is not added) and Al at 0.05% or less (excluding a case where Al is not added) so as to satisfy the following formula (1), 5*C %−Si %+Mn %−1.5*Al %<1; and also at least one of Nb from 0.03 to 0.4%, V from 0.01 to 0.3%, and Ti from 0.01 to 0.3% so as to satisfy the following formula (2), 0.04<(Nb %/1.4)+(V %/1.1)+Ti %<0.3; with a residue being formed of Fe and unavoidable impurities. In the formula (1), C % means the content of C (%), Si % means the content of Si (%), Mn % means the content of Mn (%), and Al % means the content of Al (%). Further, in the formula (2), Nb % means the content of Nb (%), V % means the content of V (%), and Ti % means the content of Ti (%).

Further, the cold-rolled steel plate may have a chemical composition containing at least one of Cr, Ni, Mo and B when needed as follows, in addition to the aforementioned chemical composition.

More specifically, the cold-rolled steel plate may have a chemical composition containing, in addition to the aforementioned chemical composition, at least one of Cr from 0.10 to 2.0%, Ni from 0.05 to 0.5%, Mo from 0.05 to 0.5%, and B from 0.0002 to 0.002% so as to satisfy the following formula (3), 5*C %−Si %+Mn %+1.6*Cr %+0.8*Ni %−1.5*Al %<1. In the formula (3), C % means the content of C (%), Si % means the content of Si (%), Mn % means the content of Mn (%), Cr % means the content of Cr (%), Ni % means the content of Ni (%), and Al % means the content of Al (%).

Each element and the content of each element in the cold-rolled steel plate are described below.

Regarding C (carbon), a content below 0.03% makes it difficult to form hard carbide particles to contribute to antiwear performance. Meanwhile, in response to increase in the content of C, the point of transformation from α to γ drops, hardness and a dilation deformation amount are increased in a part heated by frictional heat during formation of a martensitic structure, and heat conductivity is reduced. Moreover, in response to increase in the content of C, a hard structure such as a pearlite structure, bainite structure, and ferrite structure in which a cementite phase ($Fe_3C$) and fine cementite are dispersed in a particle, increases, thus deteriorating punching performance. An upper limit of the content of C determined within a range satisfying the formula (1) or (3) in consideration of a balance with other characteristics is 0.08%. Thus, the content of C is determined to be from 0.03% or more and 0.08% or less.

Regarding Si (silicon), a content below 0.4% is sufficient if Si is to be added for the general purpose of deoxidization. Meanwhile, Si has the effect of increasing the point of transformation from α to γ, so the content of Si may exceed 0.4%. Adding Si excessively to a content exceeding 1.0% is likely to cause brittle fracture during rolling of a cold-rolled steel plate, for example. Thus, the content of Si is determined to be 0% (including a case where Si is not added) or more and 1.0% or less.

Regarding Mn (manganese), Mn is an element necessary for enhancing the strength of a material steel plate and should be added to a content of 0.2% or more for enhancing the strength. Meanwhile, Mn has the effect of reducing the point of transformation from $\alpha$ to $\gamma$. Thus, adding Mn to a content exceeding 0.8% reduces the point of transformation from $\alpha$ to $\gamma$. Thus, the content of Mn is determined to be from 0.2% or more and 0.8% or less. As the content of Mn increases, a hot-rolled steel plate is more likely to be formed into a structure with bands and the nature of the hot-rolled steel plate at a punching cross section formed by punching process is more likely to be degraded. Thus, it is more preferable that the content of Mn be 0.6% or less.

Regarding P (phosphorous), adding P to a content exceeding 0.03% reduces punching performance and toughness. Thus, the content of P is determined to be 0.03% or less (excluding a case where P is not added).

Regarding S (sulfur), S forms MnS. Adding S to a content exceeding 0.01% easily generates a fracture surface in the cross sectional structure due to the soft MnS extended by rolling. Therefore, the content of S is determined to be 0.01% or less (excluding a case where S is not added).

Regarding Al (aluminum), Al is an element having a deoxidizing effect. A content below 0.01% is sufficient if Al is to be added only for the purpose of deoxidization. Meanwhile, Al has the effect of increasing the point of transformation from $\alpha$ to $\gamma$, so that the content of Al may exceed 0.01%. In the case of steel containing Nb, V or Ti added to a given concentration, adding Al in large quantities to this steel to a content exceeding 0.05% does not work advantageously in terms of the effect of increasing a transformation point. Thus, the content of Al is determined to be 0.05% or less (excluding a case where Al is not added).

Regarding Cr (chromium), Ni (nickel), Mo (molybdenum) and B (boron), these elements have the effect of enhancing antiwear performance and toughness. Thus, it is preferable that these elements be added if a counterpart spline to make a fit with the spline part 3 is hard as a result of surface hardening treatment such as carburizing or nitriding, for example.

If Cr is to be added, the content of Cr is determined to be 0.10% or more and 2.0% or less in consideration of its effect of enhancing antiwear performance and its side effect.

If Ni is to be added, the content of Ni is determined to be 0.05% or more and 0.5% or less in consideration of its effect of enhancing toughness and its side effect.

If Mo is to be added, the content of Mo is determined to be 0.05% or more and 0.5% or less in consideration of its effect of enhancing toughness and its side effect.

If B is to be added, the content of B is determined to be 0.0002% or more and 0.002% or less in consideration of its effect of enhancing toughness and its side effect.

If Cr or Ni is to be added, the point of $\alpha$ to $\gamma$ transformation and quenching in the cold-rolled steel plate are also affected by the effect of Cr or Ni. In order to increase the point of the $\alpha$ to $\gamma$ transformation and also reduce the quenching performance, comprehensive consideration relevant to the contents of C, Si, Mn, and Al, and further Cr and Ni is necessary, and each of these elements has to satisfy the formula (3), $5*C\% - Si\% + Mn\% + 1.6*Cr\% + 0.8*Ni\% - 1.5*Al\% < 1$, within the range of the contents described above.

Each of Nb (niobium), V (vanadium) and Ti (titanium) is bonded to C in steel to form a hard carbide, thus contributing to enhancement of antiwear performance. Further, each of Nb, V and Ti forms a carbide containing carbon in the steel respectively as NbC, VC and TiC having low solubility, having the effect of suppressing the $\alpha$ to $\gamma$ transformation at the part heated by frictional heat. In addition, each of Nb, V and Ti effectively suppresses coarsening of the diameter of ferrite crystal grains and softening in a part where a temperature is to be increased by friction. Thus, adding Nb, V or Ti allows for the enhancement of heat spot resistance, antiwear performance and fatigue strength.

If at least one of Nb, V and Ti is to be added, a content of 0.03% or more of Nb, a content of 0.01% or more of V, and/or a content of 0.01% or more of Ti are/is required in order to achieve the effect of heat spot resistance, antiwear performance and fatigue strength described above. However, adding exceeding 0.4% of Nb, exceeding 0.3% of V, and/or exceeding 0.3% of Ti hardens the hot-rolled steel plate, thus making it impossible to manufacture steel for a plate having targeted product plate thickness and hardness. Therefore, the content of Nb is determined to be 0.03% or more and 0.4% or less; the content of V is determined to be 0.01% or more and 0.3% or less; the content of Ti is determined to be 0.01% or more and 0.3% or less.

Heat spot resistance, antiwear performance, fatigue strength, and other side effects are affected by the respective effects of the elements Nb, V and Ti to be added. Thus, the respective contents of these elements should be examined comprehensively, and at least one of Nb, V and Ti must be added within the corresponding ranges of the aforementioned contents of Nb, V and Ti, so as to satisfy the formula (2), $0.04 < (Nb\%/1.4) + (V\%/1.1) + Ti\% < 0.3$.

An Nb-based carbide, a V-based carbide and a Ti-based carbide are considerably significant elements for enhancing heat spot resistance, antiwear performance and fatigue strength. Specifically, an Nb-based carbide, a V-based carbide and a Ti-based carbide in a surface of a cold-rolled steel plate exert their effects for enhancing heat spot resistance, antiwear performance at a surface in friction with its counterpart spline at the spline part, and fatigue strength. For this reason, the Nb-based carbide, the V-based carbide and the Ti-based carbide should be dispersed uniformly and finely.

More specifically, an average diameter of precipitates in the cold-rolled steel plate, that is, a carbide containing any one of Nb, V and Ti, should be in a range from 20 nm or more and 100 nm or less.

In particular, each of an Nb-based carbide, a V-based carbide and a Ti-based carbide existing in a surface of the cold-rolled steel plate and a front layer part near the surface largely affects heat spot resistance and antiwear performance. Thus, it is preferable that an average diameter of particles of a carbide containing any one of Nb, V and Ti, and existing in the front layer part having at least 200 μm depth or less from the surface of the cold-rolled steel plate be 20 nm or more and 100 nm or less.

Meanwhile, an Nb-based carbide, a V-based carbide and a Ti-based carbide existing in a position such as a central part and the like of the cross-sectional direction of the cold-rolled steel plate deeper than the front layer part does not contribute much to heat spot resistance. If given excellent antiwear performance, each of the Nb-based carbide, the V-based carbide and the Ti-based carbide in turn causes the risk of damage to a counterpart material. Thus, an average diameter of particles of each of the Nb-based carbide, the V-based carbide and the Ti-based carbide existing in the central part of the cross-sectional direction of the cold-rolled steel plate is only required to be substantially the same as that of the particles in the front layer part. Each of an Nb-based carbide, a V-based carbide and a Ti-based carbide in the central part of the cross-sectional direction existing in excessively larger quantities than that in the front layer part in turn is not preferable for use as a cold-rolled steel plate forming the separator plate 1. Thus, like that of each of an Nb-based carbide, a V-based carbide and a Ti-based carbide in the front layer part, it is preferable that an average diameter of particles of a carbide including any one of Nb, V and Ti in the central part of the cross-sectional direction of the cold-rolled steel plate or that of particles in the layer deeper than 200 μm from the surface of the cold-rolled steel plate be 20 nm or more and 100 nm or less.

As an element that forms a hard carbide, W (tungsten), Ta (tantalum), Zr (zirconium) and/or Hf (hafnium) may be added in addition to Nb, V and/or Ti.

A manufacturing method of the invention is described next.

First, a steel slab is smelted that has a chemical composition containing C from 0.03 to 0.08%, Si from 0 to 1.0% (including a case where Si is not added), Mn from 0.2 to 0.8%, P at 0.03% or less (excluding a case where P is not added), S at 0.01% or less (excluding a case where S is not added), and Al at 0.05% or less (excluding a case where Al is not added), so as to satisfy the formula (1); and at least one of Nb from 0.03 to 0.4%, V from 0.01 to 0.3%, and Ti from 0.01 to 0.3% so as to satisfy the formula (2); with a residue being formed of Fe and unavoidable impurities.

If containing at least one of Cr, Ni, Mo and B, a steel slab is smelted that has a chemical composition containing, in addition to the respective chemical composition above, at least one of Cr from 0.10 to 2.0%, Ni from 0.05 to 0.5%, Mo from 0.05 to 0.5%, and B from 0.0002 to 0.002% so as to satisfy the formula (3).

This steel slab is heated to 1200° C. or more and then hot rolled. A heating temperature below 1200° C. leads to the probability of failing to dissolve a carbide sufficiently.

For the hot rolling, it is preferable that a hot rolling finishing temperature be set to a temperature higher than an $Ar_3$ transformation point in terms of the quality of a hot-rolled steel plate and hot rolling efficiency, for example. Specifically, it is preferable that the finishing temperature be determined to be 850° C. or more and 950° C. or less.

A winding temperature of the hot-rolled steel plate below 550° C. produces a hard structure in a large quantity, but a winding temperature of 550° C. or above produces a structure similar to a single phase structure of ferrite with less quantity of a hard structure. Meanwhile, a winding temperature exceeding 700° C. decarburizes a surface of the steel plate notably. This reduces the quantity of the carbide precipitated in the outermost layer part and reduces the diameter of particles of the carbide. Therefore, the winding temperature is determined to be 550° C. or more and 700° C. or less, and the hot-rolled coil wound in this temperature range is used as material.

Additionally, moderate cooling to reduce a temperature from the finishing temperature to the winding temperature at an average cooling rate below 20° C. per second coarsens the precipitated carbide. Thus, it is preferable that the average cooling rate be 20° C. per second or more.

The hot-rolled steel plate is subjected to acid pickling to remove scales from a surface and is then cold rolled to become a product. More specifically, to obtain hardness required for the cold-rolled steel plate for a separator plate that is the separator plate 1, the steel plate should be cold rolled at a cold rolling ratio of 20% or more and 70% or less. The hardness is controlled by controlling the rolling ratio.

The cold-rolled steel plate to be used as a product is required to have hardness of 200 HV or more and 350 HV or less and flatness in view of punching performance. To ensure flatness, it is preferable that the cold rolling ratio be controlled in a range of 20% or more and 70% or less. Further, hardness below 200 HV causes a serious sagging and a serious burr of a punched item and causes a secondary shear surface, degrading the nature of the spline part 3. Meanwhile, hardness exceeding 350 HV causes serious wear or damage to a punch die while failing to form a shear surface in a punching surface. This makes it impossible to form a preferable shape for a spline part.

If the occasion arises, annealing may be performed directly on the hot-rolled steel plate or may be performed as intermediate annealing on the cold-rolled steel plate. In either case, it is preferable that the steel plate be cold rolled after the annealing. If the intermediate annealing is to be performed during the cold rolling process, a suitable annealing condition can be selected appropriately in view of the thickness of a product and the cold rolling ratio. An annealing condition to cause surface decarburization is not preferable.

The cold-rolled steel plate formed as described above is formed into a prescribed shape by punching or the like to produce the separator plate 1.

Regarding the aforementioned separator plate 1, the chemical composition is regulated based on the aforementioned first to fourth countermeasures and the countermeasure relevant to the punching performance, and an average diameter of particles of each of a precipitated Nb-based carbide, a V-based carbide or a Ti-based carbide is determined to be 20 nm or more and 100 nm or less, thereby allowing suppressing of the change of the metal structure and the reduction of hardness resulting from heating with the frictional heat, and allowing for enhancing fatigue strength. A conventional constitution easily causes a fatigue failure especially at a tooth tip of the spline part 3 or the like on which stress tends to act with the clutch being engaged, when frictional heat changes the metal structure. However, the metal structure in this constitution hardly changes resulting from heating with the frictional heat even at the point on which stress tends to act structurally, thus hardly causing a fatigue failure.

Therefore, the separator plate 1 excellent in heat spot resistance, antiwear performance, punching performance and fatigue strength allows for preventing the wear of the spline part 3, rattling due to an inaccurate position of the spline part 3, change in roughness due to wear on a friction surface, and generation of a heat spot and unevenness of a shape and material caused thereby.

In the embodiment described above, a hot-rolled coil is made into a cold-rolled steel plate by cold rolling and the resultant plate is formed into a prescribed shape by punching. However, in the case where the hardness of the cross section is 200 HV or more and 350 HV or less, it is not necessary to perform cold rolling or annealing to the hot-rolled coil.

The steel plate made as above is also suitable for use as a friction plate as well as a separator plate for a multiplate wet clutch, and is further available as a plate for a dry clutch.

EXAMPLES

Working Examples and Comparative Examples are described below.

Steel slabs having chemical compositions shown in Table 1 were smelted. Referring to Table 1, if at least one of Cr, Ni, Mo and B was not added, a value of the left side of the formula (1) is shown as a Q value. If at least one of Cr, Ni, Mo and B was added, a value of the left side of the formula (3) is shown as the Q value.

For the measurement of cross-sectional hardness, a part of each sample was cut out, buried in resin, and polished. Then, Vickers hardness was measured at a thickness central part of a cross section. A measuring load was 50 gf.

For the measurement of an average diameter of particles of a carbide in a front layer, a part of each sample was cut

TABLE 1

| | Steel | C | Si | Mn | P | S | Cr | Ti | Nb | Ni | V | Mo | B | Al | Q-value | Formula (2) |
|---|---|---|---|---|---|---|---|---|---|---|---|---|---|---|---|---|
| Comparative Examples | 1 | 0.07 | 0.28 | 0.54 | 0.012 | 0.006 | — | 0.01 | — | — | — | — | — | 0.010 | 0.60 | 0.01 |
| | 2 | 0.22 | 0.22 | 0.48 | 0.016 | 0.003 | — | 0.17 | 0.05 | — | — | — | — | 0.007 | 1.35 | 0.21 |
| | 3 | 0.12 | 0.07 | 0.67 | 0.015 | 0.005 | — | 0.17 | — | — | — | — | — | 0.012 | 1.18 | 0.17 |
| | 5 | 0.10 | 1.23 | 0.44 | 0.014 | 0.004 | — | 0.10 | — | — | — | 0.08 | — | 0.015 | −0.31 | 0.10 |
| | 6 | 0.02 | 0.04 | 0.41 | 0.009 | 0.005 | — | 0.11 | — | — | — | — | — | 0.009 | 0.46 | 0.11 |
| | 7 | 0.07 | 0.06 | 0.32 | 0.015 | 0.005 | — | 0.47 | — | — | — | — | — | 0.011 | 0.59 | 0.47 |
| | 8 | 0.11 | 0.06 | 0.37 | 0.016 | 0.007 | — | 0.16 | 0.35 | — | — | — | — | 0.011 | 0.84 | 0.41 |
| | 9 | 0.08 | 0.05 | 1.30 | 0.011 | 0.004 | — | 0.06 | 0.01 | — | — | — | — | 0.190 | 1.37 | 0.06 |
| | 10 | 0.15 | 0.05 | 1.32 | 0.016 | 0.004 | — | 0.22 | — | — | — | — | — | 0.041 | 1.96 | 0.22 |
| Working Examples | 13 | 0.07 | 0.03 | 0.38 | 0.014 | 0.006 | — | 0.10 | 0.07 | — | — | — | — | 0.009 | 0.69 | 0.15 |
| | 14 | 0.05 | 0.05 | 0.35 | 0.008 | 0.004 | 0.11 | 0.25 | 0.06 | — | — | — | — | 0.007 | 0.72 | 0.25 |
| | 15 | 0.06 | 0.07 | 0.40 | 0.012 | 0.003 | — | 0.09 | — | — | — | — | — | 0.010 | 0.62 | 0.09 |
| | 16 | 0.05 | 0.12 | 0.50 | 0.009 | 0.004 | — | 0.10 | — | — | — | — | 0.001 | 0.010 | 0.62 | 0.14 |
| | 17 | 0.06 | 0.05 | 0.36 | 0.012 | 0.003 | — | 0.08 | — | — | 0.10 | — | — | 0.011 | 0.59 | 0.17 |
| | 18 | 0.05 | 0.07 | 0.39 | 0.009 | 0.005 | — | 0.10 | — | — | — | 0.13 | — | 0.009 | 0.56 | 0.10 |
| | 19 | 0.05 | 0.11 | 0.41 | 0.010 | 0.005 | — | 0.09 | — | 0.11 | — | — | — | 0.008 | 0.54 | 0.19 |
| | 21 | 0.07 | 0.78 | 0.72 | 0.014 | 0.004 | — | 0.16 | — | — | — | — | — | 0.020 | 0.26 | 0.16 |
| | 22 | 0.07 | 0.15 | 0.44 | 0.011 | 0.003 | — | 0.07 | — | 0.43 | — | — | — | 0.020 | 0.95 | 0.07 |
| | 23 | 0.04 | 0.05 | 0.40 | 0.012 | 0.005 | — | 0.08 | — | — | — | — | — | 0.018 | 0.52 | 0.08 |
| | 24 | 0.03 | 0.04 | 0.31 | 0.009 | 0.004 | — | 0.05 | — | — | — | — | 0.002 | 0.015 | 0.40 | 0.05 |
| | 25 | 0.04 | 0.07 | 0.52 | 0.013 | 0.006 | — | 0.06 | — | — | 0.05 | — | — | 0.013 | 0.63 | 0.11 |
| | 26 | 0.04 | 0.04 | 0.37 | 0.013 | 0.005 | — | — | 0.10 | — | — | — | — | 0.024 | 0.49 | 0.07 |
| | 27 | 0.05 | 0.05 | 0.39 | 0.011 | 0.004 | — | — | 0.35 | — | — | — | — | 0.020 | 0.56 | 0.25 |
| | 28 | 0.05 | 0.03 | 0.35 | 0.010 | 0.003 | — | — | — | — | 0.07 | — | — | 0.022 | 0.54 | 0.06 |
| | 29 | 0.06 | 0.05 | 0.36 | 0.014 | 0.005 | — | — | — | — | 0.27 | — | — | 0.014 | 0.59 | 0.25 |
| | 30 | 0.04 | 0.04 | 0.40 | 0.015 | 0.003 | — | — | 0.15 | — | 0.10 | — | — | 0.028 | 0.52 | 0.20 |
| | 31 | 0.06 | 0.02 | 0.38 | 0.012 | 0.004 | — | 0.12 | 0.10 | — | 0.10 | — | — | 0.020 | 0.63 | 0.28 |
| | 32 | 0.05 | 0.03 | 0.39 | 0.010 | 0.004 | — | 0.06 | 0.08 | — | 0.05 | — | — | 0.022 | 0.58 | 0.16 |
| | 33 | 0.05 | 0.05 | 0.36 | 0.011 | 0.005 | — | 0.03 | 0.02 | — | 0.02 | — | — | 0.019 | 0.53 | 0.06 |
| | 34 | 0.11 | 0.05 | 0.36 | 0.012 | 0.003 | — | — | 0.12 | — | 0.08 | — | — | 0.024 | 0.82 | 0.16 |
| | 35 | 0.10 | 0.06 | 0.38 | 0.014 | 0.005 | — | — | 0.32 | — | — | — | — | 0.021 | 0.79 | 0.23 |

Using various types of steel slabs, hot rolling and cold rolling were performed under conditions shown in Table 2 to produce various types of samples.

The hot rolling was performed at a heating temperature of 1250° C. A winding temperature was set at any of 450° C., 520° C., 570° C., 600° C., 630° C., 650° C. and 725° C.

After being pickled with hydrochloric acid, the hot-rolled steel plates were finished to a thickness of 1.8 mm at various cold rolling ratios. Target cross-sectional hardness at a time after the cold rolling was 250 HV. According to a part of the Working Examples and Comparative Examples, a hot-rolled steel plate was annealed at 690° C. and then cold rolled.

Each of these sample cold-rolled steel plates was subjected to measurement of heat conductivity, measurement of cross-sectional hardness, and measurement of an average diameter of particles of a precipitated carbide (Nb-based carbide (NbC), V-based carbide (VC or V4C3, hereinafter referred to as VC), and Ti-based carbide (TiC)).

Figure 2A:
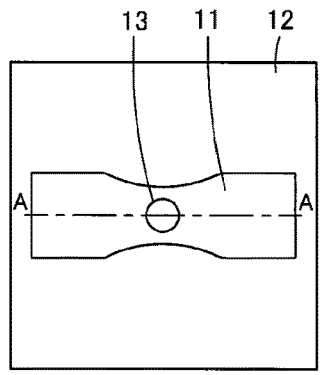
FIG. 2A is a plane view showing the state of a fatigue test piece of an example of this invention.
Figure 2B:
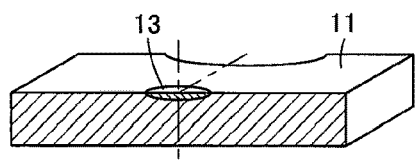
FIG. 2B is a sectional view of the same fatigue test piece.
Figure 2C:
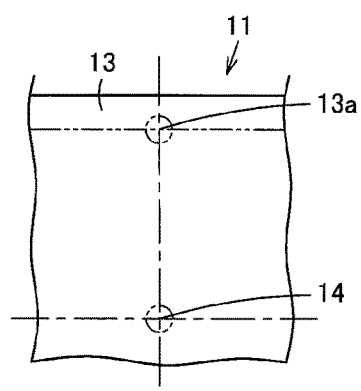
FIG. 2C illustrates a hardness measuring point.

Further, a test piece 11 in the shape shown in FIG. 2 is made of each of the samples by punching process, and subjected to a punching test, and a hardness measurement and a fatigue test at an irradiation part. In the test piece 11 having the plate thickness of 1.8 mm, a clearance for punching is 8% of the plate thickness. After the punching, burrs are removed by use of emery paper of No. 600.

For the measurement of heat conductivity, heat conductivity was measured in a range from 100 to 200° C. using a laser flash method. A test piece with measured heat conductivity of 50 Wm·K or more was evaluated as being good and is indicated with ○ in Table 2.

and buried in resin so as to obtain an observation surface parallel to a rolling direction of a cold-rolled steel plate. Then, this part was etched to produce an extraction replica and a precipitate was observed. The item solely containing Nb out of Nb, V and Ti was observed for NbC; the item solely containing V was observed for VC; the item solely containing Ti was observed for TiC; and the item containing some of them in combination was observed for corresponding precipitates out of NbC, VC and TiC. A transmission electron microscope (TEM) was used for the observation. The size of the precipitate was determined in terms of a circle with an image analyzer and the diameter of each precipitate was calculated. An imaging magnification ratio was 50,000 and ten fields of view were observed. A sum of the calculated particle diameters of the precipitates was divided by the number of the precipitates to obtain an average particle diameter. Regarding the average particle diameter of the precipitates of each sample measured in this way, an average particle diameter below 20 nm was evaluated as A, an average particle diameter from 20 to 100 nm was evaluated as B, and an average particle diameter exceeding 100 nm was evaluated as C, as shown in Table 2.

For the punching test, a circular hole of a thickness of 1.8 mm and a diameter of 10 mm was punched out of each test piece 11 using a 300 kN universal tester. For a punch die, SKD11 conforming to the JIS standards mainly for cold work dies having a punch and a dice both controlled at 60 HRC was used. The test was conducted under conditions of a punching speed of 1.7 mm/s and a clearance of 5%. A punched item with 20 to 30 punching shots was collected and was evaluated in terms of the amount of sagging at a shear surface and a shear surface rate. More specifically, each index was measured and an average was calculated in a direction in which a material steel plate was rolled and in a direction at a right angle to the rolling direction. A test piece having a primary shear surface rate of 50% or more and sagging below 0.2 mm was evaluated as being good and is indicated with ○ in Table 2.

For the irradiation-part hardness measurement, each of the test pieces 11 was fixed by a bolt not shown in the figure to the center part on the surface of a steel block 12 having a surface shape of 60 mm by 60 mm with a thickness of 20 mm. Then, a laser beam was applied to a central part of a surface of each of the test pieces 11. Regarding conditions for the irradiation, a $CO_2$ laser was applied with an effective output of 1080 W, a beam shape was 6 mm in diameter, and an irradiation time was 0.75 seconds.

The front layer part was locally heated by irradiation of such powerful laser light to a surface of each of the test pieces for a short time. When the laser irradiation was stopped, the self-cooling effect of the steel plate rapidly cooled the heated part to produce a characteristic altered layer (layer containing martensite subjected to structure change) in a heat spot. Even when the martensitic phase is not formed, temperature increase resulting from the laser irradiation may cause recrystallization of a material steel plate hardened by cold rolling to form coarse crystal grains, thereby reducing hardness in some cases. If the altered layer is formed in this way resulting from either hardening or softening, a difference is generated between cross-sectional hardness inside the material steel plate and hardness at the laser-irradiated part. This allows evaluation of fatigue characteristics by means of measurement of cross-sectional hardness at a front layer part and internal cross-sectional hardness.

In the cross section of the test piece 11 after the laser irradiation, Vickers hardness was measured at a laser-irradiated measuring site 13a that is the part with a depth of 100 μm from a surface of a laser-irradiated part 13 irradiated with the laser and at a thickness central part 14 corresponding to a central part of a thickness direction. Then, a degree of hardening or softening of the front layer (laser-irradiated measuring site 13a) relative to the internal hardness (hardness of the thickness central part 14) was evaluated. In Table 2, a test piece 11 generating a difference of ±50 HV or less between the hardness at the front layer and the internal hardness was evaluated as being good and is indicated by ○, a test piece 11 generating a difference exceeding 50 HV but below 100 HV is indicated by Δ, a test piece 11 generating a difference of 100 HV or more is indicated by ΔΔ, and a test piece 11 generating a difference below −50 HV is indicated by □.

For the fatigue test, after a laser was irradiated to the test piece 11 in the same manner as the irradiation-part hardness measurement, an alternating stress test was performed to the test piece 11 with the maximum bending stress of 350 MPa at room temperature with a frequency of 20 Hz by use of a plane bending fatigue testing device. A case in which the number of fractures was $10^5$ or more was evaluated as being good and is indicated by ○ in Table 2.

Respective conditions for the tests and test results are shown in Table 2.

TABLE 2

| Test No | | Hot rolling condition | Average cooling rate | Annealing | Cold rolling | Plate thickness (mm) | Hardness of cross section (HV) | Average particle diameter of carbide in front layer Part (μm) | Heat conductivity | Punching test | TESTED WITH FATIGUE TEST PIECE Irradiated part hardness measurement | Fatigue test | Comprehensive evaluation | SAE• No. 2 test |
|---|---|---|---|---|---|---|---|---|---|---|---|---|---|---|
| 1 | Comparative Example | 1250° C. heating to 570° C. winding | 33° C./sec | No | Yes | 1.8 | 254 | A | ○ | ○ | ▼ | x | x | |
| 2 | Comparative Example | 1250° C. heating to 570° C. winding | 31° C./sec | No | Yes | 1.8 | 265 | B | x | ○ | ΔΔ | x | x | |
| 3 | Comparative Example | 1250° C. heating to 570° C. winding | 28° C./sec | No | Yes | 1.8 | 256 | B | ○ | ○ | Δ | x | x | |
| 5 | Comparative Example | 1250° C. heating to 570° C. winding | 28° C./sec | No | Yes | 1.8 | 363 | B | ○ | x | ○ | x | x | |
| 6 | Comparative Example | 1250° C. heating to 570° C. winding | 30° C./sec | No | Yes | 1.8 | 258 | B | ○ | ○ | ▼ | x | x | |
| 7 | Comparative Example | 1250° C. heating to 570° C. winding | 29° C./sec | No | Yes | 1.8 | 377 | C | ○ | x | ○ | x | x | |

TABLE 2-continued

| Test No | | Hot rolling condition | Average cooling rate | Annealing | Cold rolling | Plate thickness (mm) | Hardness of cross section (HV) | Average particle diameter of carbide in front layer Part (μm) | Heat conductivity | TESTED WITH FATIGUE TEST PIECE | | | Comprehensive evaluation | SAE• No. 2 test |
|---|---|---|---|---|---|---|---|---|---|---|---|---|---|---|
| | | | | | | | | | | Punching test | Irradiated part hardness measurement | Fatigue test | | |
| 8 | Comparative Example | 1250° C. heating to 570° C. winding | 32° C./sec | No | Yes | 1.8 | 347 | B | ○ | x | ○ | x | x | |
| 9 | Comparative Example | 1250° C. heating to 600° C. winding | 33° C./sec | No | Yes | 1.8 | 246 | B | ○ | x | Δ | x | x | x |
| 10 | Comparative Example | 1250° C. heating to 600° C. winding | 30° C./sec | No | Yes | 1.8 | 254 | B | x | x | ΔΔ | x | x | x |
| 13 | Working Example | 1250° C. heating to 570° C. winding | 27° C./sec | No | Yes | 1.8 | 252 | B | ○ | ○ | ○ | ○ | ○ | ○ |
| 14 | Working Example | 1250° C. heating to 570° C. winding | 30° C./sec | No | Yes | 1.8 | 261 | B | ○ | ○ | ○ | ○ | ○ | |
| 15 | Working Example | 1250° C. heating to 570° C. winding | 32° C./sec | No | Yes | 1.8 | 256 | B | ○ | ○ | ○ | ○ | ○ | |
| 16 | Working Example | 1250° C. heating to 570° C. winding | 29° C./sec | No | Yes | 1.8 | 248 | B | ○ | ○ | ○ | ○ | ○ | |
| 17 | Working Example | 1250° C. heating to 570° C. winding | 32° C./sec | No | Yes | 1.8 | 257 | B | ○ | ○ | ○ | ○ | ○ | |
| 18 | Working Example | 1250° C. heating to 570° C. winding | 27° C./sec | No | Yes | 1.8 | 255 | B | ○ | ○ | ○ | ○ | ○ | |
| 19 | Working Example | 1250° C. heating to 650° C. winding | 26° C./sec | No | Yes | 1.8 | 260 | B | ○ | ○ | ○ | ○ | ○ | |
| 21 | Working Example | 1250° C. heating to 650° C. winding | 28° C./sec | No | Yes | 1.8 | 266 | B | ○ | ○ | ○ | ○ | ○ | |
| 22 | Working Example | 1250° C. heating to 650° C. winding | 33° C./sec | No | Yes | 1.8 | 263 | B | ○ | ○ | ○ | ○ | ○ | |
| 23 | Working Example | 1250° C. heating to 650° C. winding | 31° C./sec | No | Yes | 1.8 | 251 | B | ○ | ○ | ○ | ○ | ○ | |
| 24 | Working Example | 1250° C. heating to 650° C. winding | 28° C./sec | No | Yes | 1.8 | 258 | B | ○ | ○ | ○ | ○ | ○ | |
| 25 | Working Example | 1250° C. heating to 600° C. winding | 32° C./sec | No | Yes | 1.8 | 246 | B | ○ | ○ | ○ | ○ | ○ | |
| 26 | Working Example | 1250° C. heating to 630° C. winding | 27° C./sec | No | Yes | 1.8 | 238 | B | ○ | ○ | ○ | ○ | ○ | |
| 27 | Working Example | 1250° C. heating to 630° C. winding | 28° C./sec | No | Yes | 1.8 | 282 | B | ○ | ○ | ○ | ○ | ○ | ○ |

TABLE 2-continued

| Test No | | Hot rolling condition | Average cooling rate | An-nealing | Cold rolling | Plate thickness (mm) | Hardness of cross section (HV) | Average particle diameter of carbide in front layer Part (μm) | Heat conductivity | TESTED WITH FATIGUE TEST PIECE | | | | SAE• No. 2 test |
|---|---|---|---|---|---|---|---|---|---|---|---|---|---|---|
| | | | | | | | | | | Punching test | Irradiated part hardness measurement | Fatigue test | Comprehensive evaluation | |
| 28 | Working Example | 1250° C. heating to 630° C. winding | 32° C./sec | No | Yes | 1.8 | 234 | B | ○ | ○ | ○ | ○ | ○ | |
| 29 | Working Example | 1250° C. heating to 630° C. winding | 30° C./sec | No | Yes | 1.8 | 278 | B | ○ | ○ | ○ | ○ | ○ | |
| 30 | Working Example | 1250° C. heating to 630° C. winding | 25° C./sec | No | Yes | 1.8 | 297 | B | ○ | ○ | ○ | ○ | ○ | |
| 31 | Working Example | 1250° C. heating to 600° C. winding | 23° C./sec | No | Yes | 1.8 | 323 | B | ○ | ○ | ○ | ○ | ○ | ○ |
| 32-a | Working Example | 1250° C. heating to 600° C. winding | 24° C./sec | No | Yes | 1.8 | 292 | B | ○ | ○ | ○ | ○ | ○ | |
| 32-b | Comparative Example | 1250° C. heating to 725° C. winding | 28° C./sec | No | Yes | 1.8 | 266 | A | ○ | ○ | ▼ | x | x | |
| 32-c | Comparative Example | 1250° C. heating to 450° C. winding | 30° C./sec | No | No | 1.8 | 415 | A | ○ | x | ▼ | x | x | x |
| 32-d | Comparative Example | 1250° C. heating to 630° C. winding | 11° C./sec | No | No | 1.8 | 260 | C | ○ | ○ | ▼ | x | x | |

As shown in Table 2, all Working Examples achieved favorable results in terms of fatigue characteristics in the irradiation-part hardness measurement and in the fatigue test, providing favorable results of fatigue strength.

Regarding Test No. 1 corresponding to a Comparative Example, it is considered that, since neither Nb or V is contained and little of Ti is contained, a fine carbide was hardly precipitated, thus lowering antiwear performance of the test piece and softening the surface thereof by rapid heating and rapid cooling due to laser irradiation. It is further considered that, as a result, fatigue strength was reduced due to the reduced hardness of the surface affected by heat.

Regarding Test No. 2 corresponding to a Comparative Example, it is considered that, since the content of C exceeds 0.08%, martensitic transformation occurred at the part heated by laser irradiation, thus hardening the surface of the test piece and also reducing heat conductivity. Then, it is further considered that, because of a high content of C, the generated martensite was brittle and fatigue strength was reduced.

Regarding Test No. 3 corresponding to a Comparative Example, it is considered that, since the Q-value of the test piece is larger than 1, martensitic transformation occurred at the part heated by laser irradiation, thus generating tensile stress in the surrounding of the part and reducing fatigue strength.

Regarding Test No. 5 corresponding to a Comparative Example, it is considered that, since the content of Si exceeds 1.0%, the processability of the test piece was lowered, thus deteriorating punched surface characteristics. It is further considered that, as a result, fatigue failure progressed from the side surface of the test piece 11, starting from the fracture surface of the punched surface.

Regarding Test No. 6 corresponding to a Comparative Example, since the content of C is below 0.03%, less amount of a carbide and cementite were precipitated, thus reducing antiwear performance of the test piece and also softening the part heated by laser irradiation. It is further considered that, as a result, fatigue strength was reduced due to the lowered hardness of the surface affected by heat.

Regarding Test No. 7 corresponding to a Comparative Example, it is considered that, since the content of Ti exceeds 0.3%, the material of the test piece was hardened, thus deteriorating the characteristics of the punched surface. It is further considered that, as a result, fatigue failure progressed from the side surface of the test piece 11, starting from the fracture surface of the punched surface.

Regarding Test No. 8 corresponding to a Comparative Example, it is considered that, since the value of the formula (2) relevant to the contents of Ti and Nb exceeds 0.3, the material of the test piece was hardened, thus deteriorating the characteristics of the punched surface. It is further considered that, as a result, fatigue failure progressed from the side surface of the test piece 11, starting from the fracture surface of the punched surface.

Regarding test No. 9 corresponding to a Comparative Example, it is considered that, since the content of Mn exceeds 0.8% and the Q-value of the test piece is more than 1, the characteristic of the punched surface was deteriorated, and further the part heated by laser irradiation was hardened. It is further considered that the martensitic transformation occurring at the heated part generated tensile stress in the surrounding of the part, thus lowering fatigue strength.

Regarding Test No. 10 corresponding to a Comparative Example, it is considered that, since the content of Mn exceeds 0.8% and the Q-value of the test piece is more than 1, the characteristic of the punched surface was deteriorated, and further the part heated by laser irradiation was hardened, and that, since the content of C exceeds 0.08%, heat conductivity was reduced. It is further considered that the martensitic transformation occurring at the heated part generated tensile stress in the surrounding of the part, thus reducing fatigue strength.

Regarding Test No. 32-b corresponding to a Comparative Example, it is considered that, since a winding temperature after hot rolling is higher than 700° C., surface decarburization progressed and the particle diameters of the carbide precipitated in the front layer part of the test piece were smaller, thus reducing antiwear performance and softening the part heated by laser irradiation. It is further considered that, as a result, fatigue strength was reduced due to the reduced hardness of the surface affected by heat.

Regarding Test No. 32-c corresponding to a Comparative Example, it is considered that, since the winding temperature after hot rolling is lower than 500° C., the carbide precipitated in the front layer part of the test piece was coarsened, thus hardening the material thereof and deteriorating punching performance, and also softening the part heated by laser irradiation. It is further considered that, as a result, fatigue failure progressed from the side surface of the test piece 11, starting from the fracture surface of the punched surface.

Regarding Test No. 32-d corresponding to a Comparative Example, it is considered that, since the cooling rate is slower than 20° C./sec, the carbide precipitated in the front layer part of the test piece was coarsened, thus hardening the surface thereof during the rapid heating and rapid cooling test. It is further considered that, as a result, the γ particle diameters of the test piece were coarsened at the part affected by heat, thus deteriorating fatigue characteristics.

For each of Test No. 13, Test No. 27, Test No. 31 and Test No. 34 corresponding to Working Examples, and each of Test No. 9, Test No. 10 and Test No. 32-c corresponding to Comparative Examples, each of the test pieces was actually formed into the shape of a separator plate. A clutch performance test was performed for each of these test pieces by an SAE-No. 2 testing device, which is a clutch friction tester, to confirm the presence or absence of a heat spot by visual observation.

As a result, the occurrence of a heat spot was not observed in any of Working Examples. In contrast, the occurrence of a heat spot was observed in all Comparative Examples.

What is claimed is:

1. A method of manufacturing a clutch plate for a multi plate wet clutch, comprising a steel slab having a chemical composition on a basis of percent by mass, C from 0.03 to 0.08%, Si from 0 to 1.0%, Mn from 0.2 to 0.8%, P at 0.03% or less, S at 0.01% or less, and Al at 0.05% or less, so as to satisfy a formula (1), and the chemical composition further containing at least one of Nb from 0.03 to 0.4%, V from 0.01 to 0.3%, and Ti from 0.01 to 0.3%, so as to satisfy a formula (2), with a residue being formed of Fe and unavoidable impurities, wherein $$5*C\ \%-Si\ \%+Mn\ \%-1.5*Al\ \%<1;\ and \qquad \text{Formula (1):}$$

$$0.04<(Nb\ \%/1.4)+(V\ \%/1.1)+Ti\ \%<0.3, \qquad \text{Formula (2):}$$

comprising the steps of:
smelting the steel slab;
heating the steel slab to 1200° C. or more and hot rolling at a finishing temperature of 850° C. or more and 950° C. or less to form a hot-rolled steel plate;
cooling the hot-rolled steel plate at an average cooling rate of 20° C. per second or more from the finishing temperature to the winding temperature;
winding the cooled hot-rolled steel plate from 550 to 700° C. to form a hot-rolled coil;
making a steel plate having an average diameter of particles of a carbide containing any one of the Nb, the V and the Ti as a precipitate in the steel plate is from 20 to 100 nm by use of the hot-rolled coil; and
forming the steel plate into a prescribed shape.

2. The method of manufacturing the clutch plate for a multiplate wet clutch according to claim 1, further comprising the steps of:
cold rolling the hot-rolled coil or annealing and cold rolling the hot-rolled coil, thereby obtaining cross-sectional hardness from 200 to 350 HV, and
forming the cold-rolled steel plate into a prescribed shape,
wherein the average diameter of the particles of the carbide containing any one of the Nb, the V and the Ti as a precipitate is from 20 to 100 nm in a front layer part extending at least 200 μm from a surf ace of the steel plate.

3. The method of manufacturing the clutch plate for a multiplate wet clutch according to claim 2, wherein
the cold rolling step further comprises the step of annealing the hot rolled coil before cold rolling.

4. The method of manufacturing a clutch plate for a multiplate wet clutch, comprising a steel slab having a chemical composition, on a basis of percent by mass, C from 0.03 to 0.08%, Si from 0 to 1.0%, Mn from 0.2 to 0.8%, P at 0.03% or less, S at 0.01% or less, and Al at 0.05% or less, so as to satisfy a formula (1), at least one of Nb from 0.03 to 0.4%, V from 0.01 to 0.3%, and Ti from 0.01 to 0.3%, so as to satisfy a formula (2), and at least one of Cr from 0.10 to 2.0%, Ni from 0.05 to 0.5%, Mo from 0.05 to 0.5%, and B from 0.0002 to 0.002%, so as to satisfy a formula (3), with a residue being formed of Fe and unavoidable impurities, wherein $$5*C\ \%-Si\ \%+Mn\ \%-1.5*Al\ \%<1; \qquad \text{Formula (1):}$$

$$0.04<(Nb\ \%/1.4)+(V\ \%/1.1)+Ti\ \%<0.3;\ and \qquad \text{Formula (2):}$$

$$5*C\ \%-Si\ \%+Mn\ \%+1.6*Cr\ \%+0.8*Ni\ \%-1.5*Al\ \%<1; \qquad \text{Formula (3):}$$

comprising the steps of:
smelting the steel slab;
heating the steel slab to 1200° C. or more and hot rolling at a finishing temperature of 850° C. or more and 950° C. or less to form a hot-rolled steel plate;
cooling the hot-rolled steel plate at an average cooling rate of 20° C. per second or more from the finishing temperature to the winding temperature;
winding the cooled hot-rolled steel plate from 550 to 700° C. to form a hot-rolled coil;

resulting in a steel plate having an average diameter of particles of a carbide containing any one of the Nb, the V and the Ti as a precipitate in the steel plate is from 20 to 100 nm by use of the hot-rolled coil; and forming the steel plate into a prescribed shape.

5. The method of manufacturing the clutch plate for a multiplate wet clutch according to claim 4, wherein the average diameter of the particles of the carbide containing any one of the Nb, the V and the Ti as a precipitate is from 20 to 100 nm in a front layer part extending at least 200 μm from a surface of the steel plate, and further comprising the steps of:

cold rolling the hot-rolled coil or annealing and cold rolling the hot-rolled coil, thereby obtaining cross-sectional hardness from 200 to 350 HV, and forming the cold-rolled steel plate into a prescribed shape.

6. The method of manufacturing the clutch plate for a multiplate wet clutch according to claim 5, wherein the cold rolling step further comprises the step of annealing the hot rolled coil before cold rolling.

* * * * *